Aug. 18, 1953  B. J. CRAIG  2,649,323
BOLT ASSEMBLY
Original Filed May 3, 1944  4 Sheets-Sheet 1
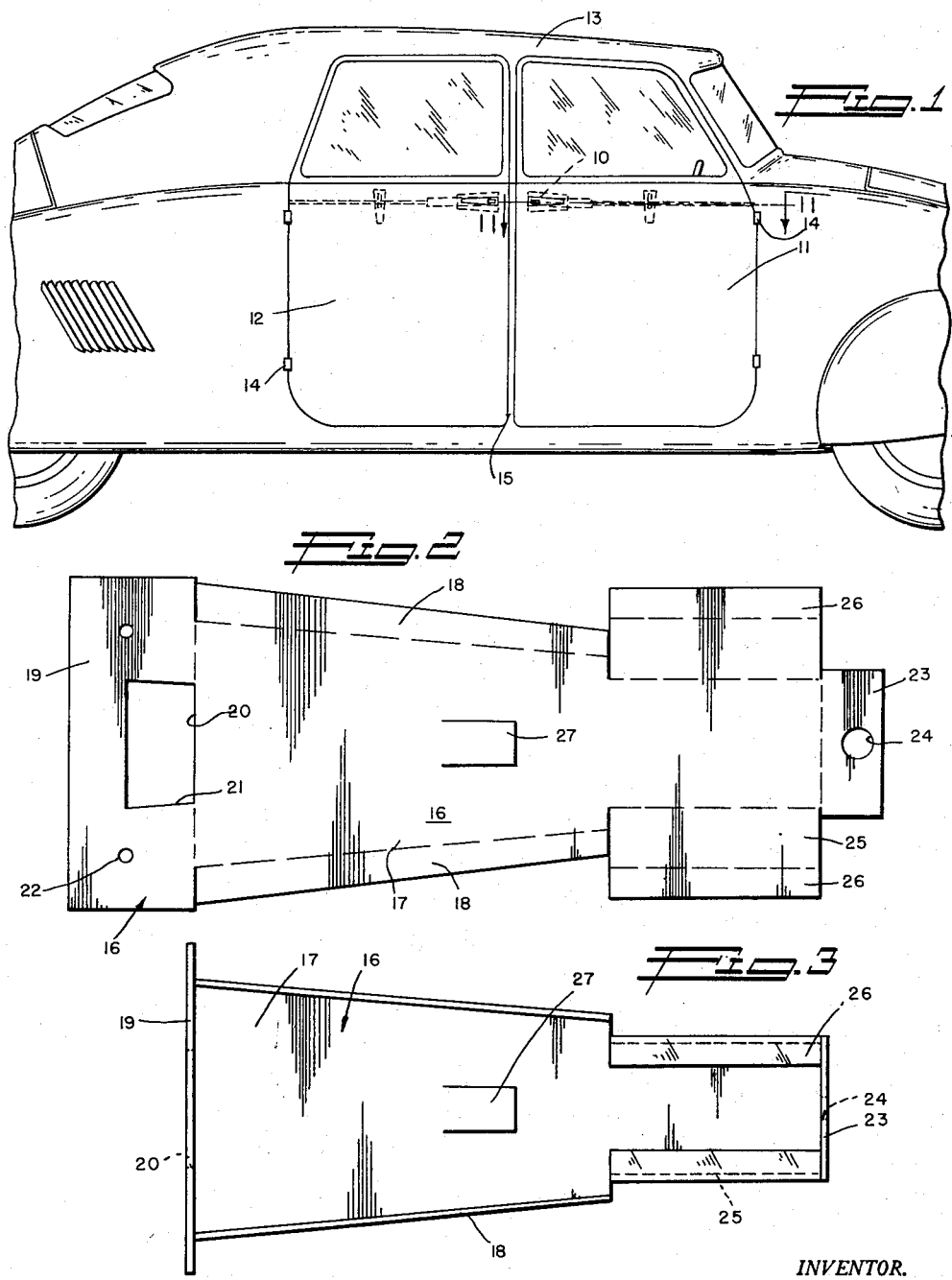
INVENTOR.
B. J. Craig.

Aug. 18, 1953
B. J. CRAIG
2,649,323
BOLT ASSEMBLY
Original Filed May 3, 1944
4 Sheets-Sheet 2
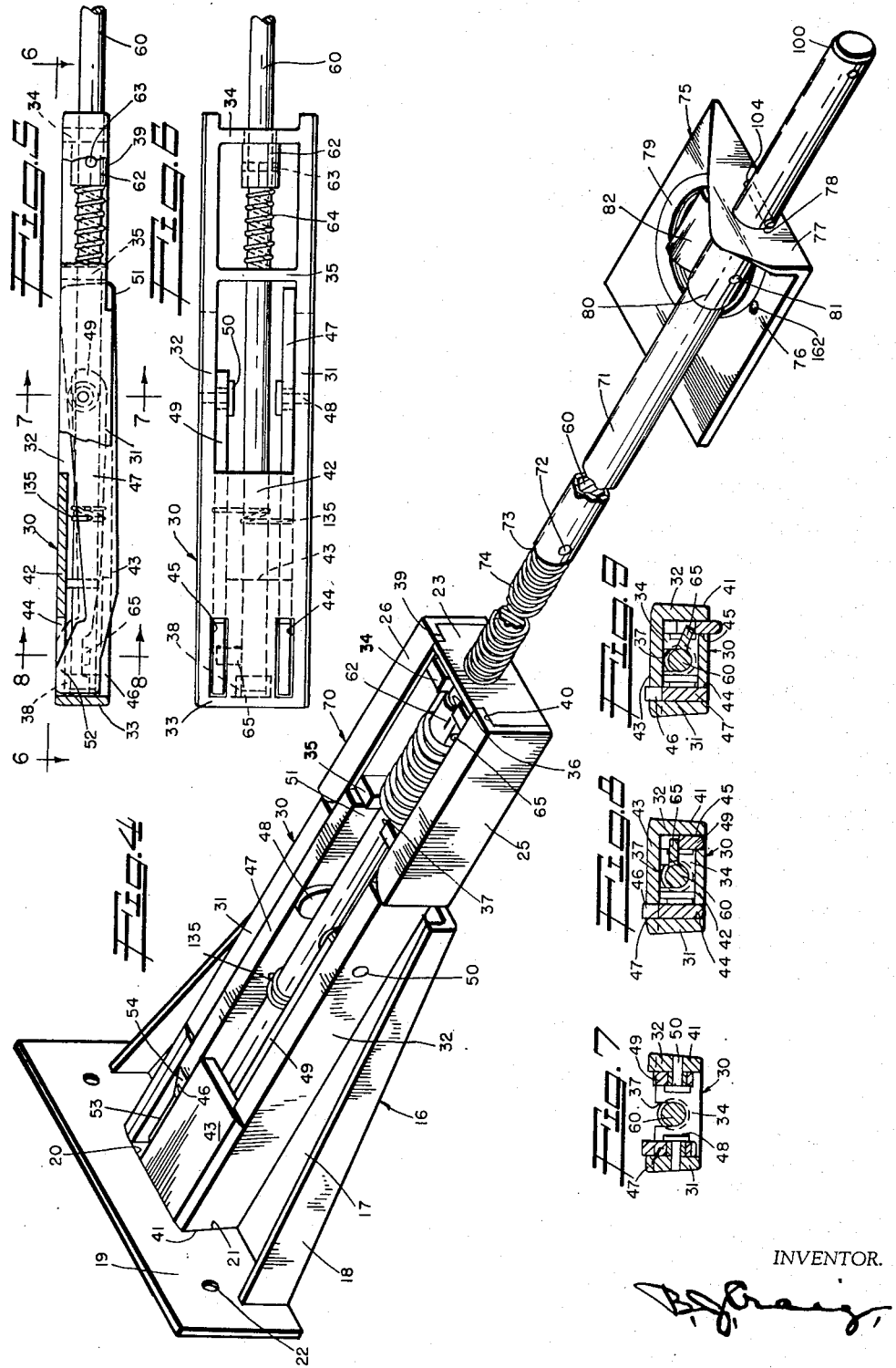
INVENTOR.
B. J. Craig Aug. 18, 1953   B. J. CRAIG   2,649,323
BOLT ASSEMBLY
Original Filed May 3, 1944    4 Sheets-Sheet 3
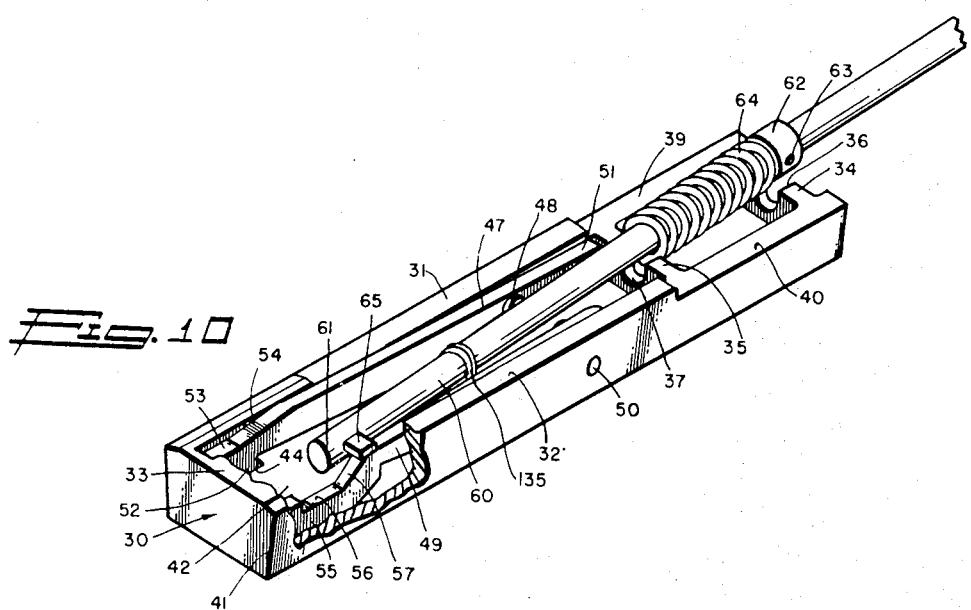
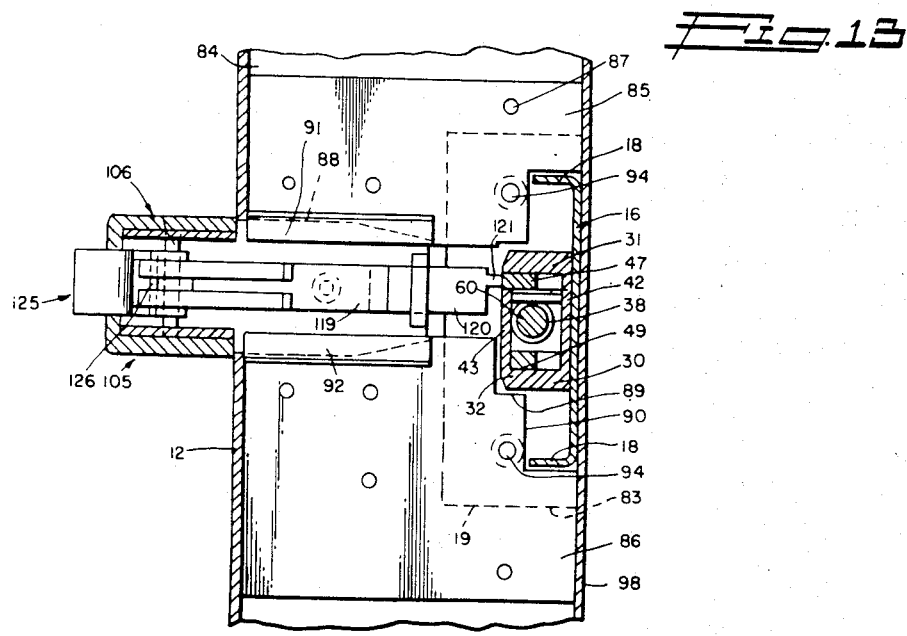
INVENTOR.
B. J. Craig

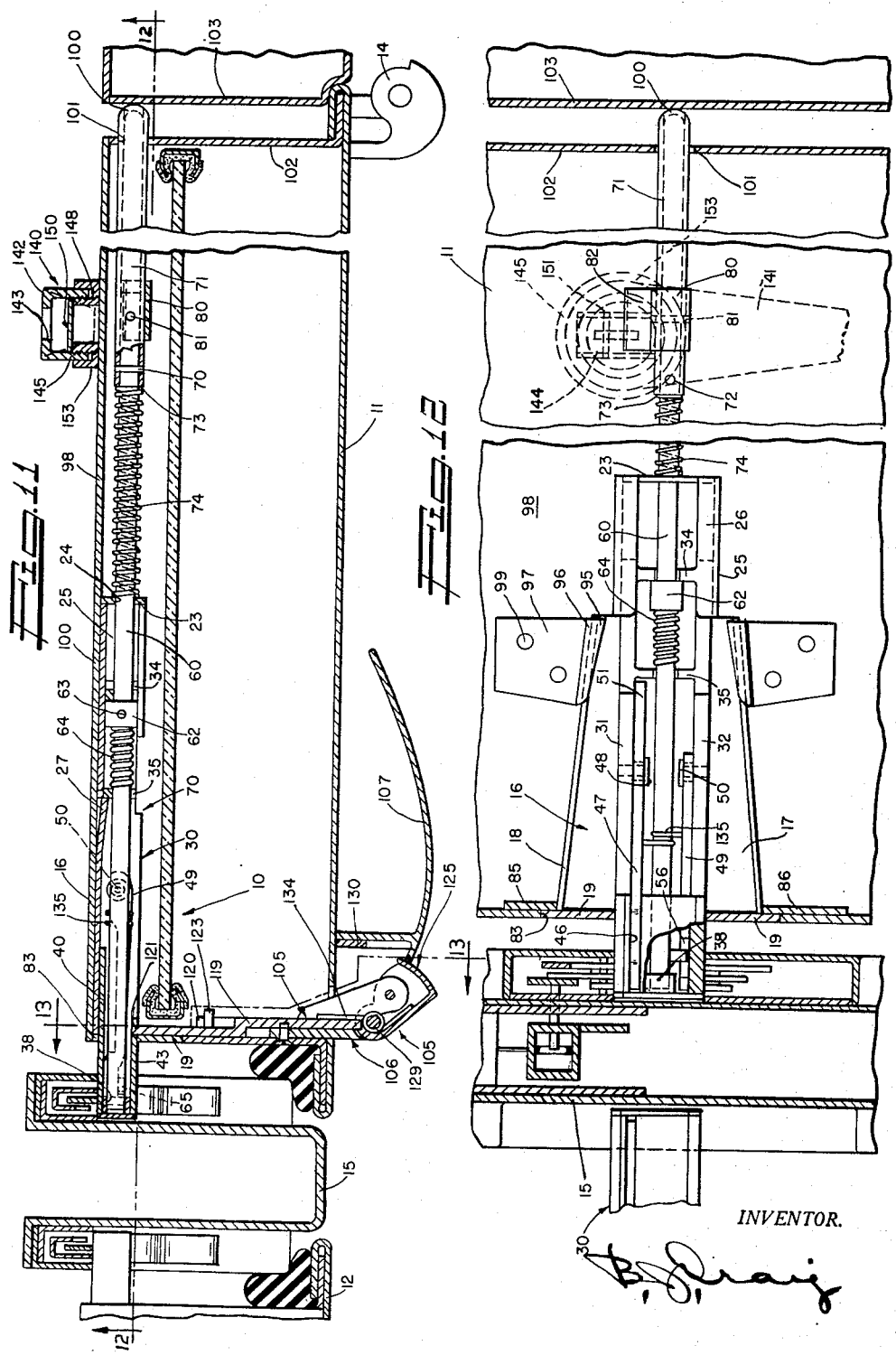

Patented Aug. 18, 1953

2,649,323

UNITED STATES PATENT OFFICE 2,649,323

BOLT ASSEMBLY

Burnie J. Craig, Los Angeles County, Calif.

Original application May 3, 1944, Serial No. 533,958, now Patent No. 2,450,372, dated September 28, 1948. Divided and this application June 25, 1948, Serial No. 35,171

9 Claims. (Cl. 292—181)

This invention relates to a bolt assembly.

The general object of the invention is to provide a bolt assembly which includes a novel bolt casing and bolt member.

A more specific object of the invention is to provide a bolt assembly including a bolt which has novel catch release members thereon.

A further object of the invention is to provide a bolt assembly including novel means for holding the assembly in place.

Another object of the invention is to provide a novel casing.

Another object of the invention is to provide a novel bolt actuating member.

A further object of the invention is to provide a novel bolt.

Other objects and advantages of the invention will be apparent from the following description taken in connection with the accompanying drawings, wherein:

Fig. 1 is a fragmentary side elevation showing a vehicle equipped with latches embodying the features of this invention;

Fig. 2 is a plan view of the bolt support blank;

Fig. 3 is a view similar to Fig. 2 showing the completed support;

Fig. 4 is an isometric view showing the bolt assembly;

Fig. 5 is a side elevation, partly in section and with parts broken away, showing the bolt;

Fig. 6 is a bottom plan view of the bolt looking in the direction of the arrow 6—6, Fig. 5;

Fig. 7 is a section taken on line 7—7, Fig. 5;

Fig. 8 is a section taken on line 8—8, Fig. 5;

Fig. 9 is a view similar to Fig. 8 with the parts in another position;

Fig. 10 is an isometric view with parts broken away showing the manner in which the bolt parts are assembled.

Fig. 11 is a sectional view taken on line 11—11, Fig. 1, on an enlarged scale;

Fig. 12 is a sectional view taken on line 12—12, Fig. 11; and

Fig. 13 is a view taken on line 13—13, Fig. 11.

This application is a division of application Serial No. 533,958, filed May 3, 1944, now Patent No. 2,450,372, issued September 28, 1948.

In the accompanying drawings the invention is shown as embodied in an automotive vehicle door latch which is indicated generally at 10. A latch is provided for each front door 11 and each rear door 12 of a four-door sedan type automotive vehicle 13 although the invention is adapted for use with other types of vehicles having more or less than four doors. The doors are mounted on hinges 14 for movement towards and from body pillars 15. The latches 10 for the front and rear doors are preferably identical with each other except for the fact that they are rights and lefts.

Each latch 10 includes a support or base plate 16 which may be made from a blank as shown in Fig. 2. The support includes a body portion 17 from which vertical side flanges 18 extend. These flanges 18 converge towards one end of the body and decrease in height towards the converging end. A selvage plate 19 is bent up from the body portion 17 and is provided with a slot 20 through which a bolt member (to be later described) reciprocates. The sides 21 of the slot 20 converge towards the body 17. The selvage plate includes apertures 22 through which fastening members may extend.

Opposite the selvage plate 19 the body includes an inner end wall 23 which has a hole 24 therein. Between the flanges 18 and the end 23 I provide inner flanges 25 which are arranged perpendicular to the base plate 16 and have their upper ends 26 bent inwardly in parallel relation to the base to form wings. The body portion 17 is provided with a tongue 27 which is struck therefrom and which is bent slightly inwardly when the parts are assembled as shown in Fig. 11. The tongue 27 serves to hold the parts assembled and to limit the forward movement of the bolt as will be later described.

The support 16 receives a bolt 30 (Fig. 10) which includes side rails 31 and 32, a front end 33, a rear partition 34 and an intermediate partition 35. The partitions 34 and 35 are provided with outwardly opening slots 36 and 37 and the front 33 is provided with a short, inwardly extending sleeve 38 (see Figs. 6 and 11). The rails 31 and 32 are reduced in height at their inner ends as at 39 and 40.

The bolt is of rectangular form and the front portion is bevelled slightly as at 41 to fit the bevelled edges 21 of the slot 20.

The lower face of the bolt at one end is provided with an inner closure member 42 (Fig. 5) and an outer closure 43 (Fig. 4) which may be shorter than the member 42. The various parts of the bolt may be secured in place as by welding or the bolt may be a die casting. The member 42 is provided with a pair of slots 44 and 45 which extend rearwardly from the front end 33 of the bolt. The closure 43 is provided with a slot 46 which opens rearwardly and which is aligned with the slot 44 previously mentioned.

An actuating arm or catch release member 47 is pivoted as at 48 at one side of the bolt on the rail 31 and a second actuating arm or catch release member 49 is pivoted as at 50 to the other rail 32 of the bolt. The arm 47 extends rearwardly at 51 beyond the pivot 48 and this rearwardly extending portion, when the bolt is assembled on the support 16, engages the support and limits upward movement of the outer end of the arm 47 from the position shown in Fig. 4.

The arm 47 includes an ear 52 which fits in the slot 44. The arm 47 just above the ear 52 is flat as at 53 (Fig. 10) and this flat portion merges into an inclined portion 54, the purpose of which will be presently described. The arrangement is such that when the arm 47 is pushed inwardly the ear 52 will project through the slot 44.

The arm 49 includes an ear 55 which projects through the slot 45. The arm 49 includes a notch 56. The inner end of the notch 56 is defined by a sloping wall 57.

In order to operate the arm 49 I provide an operating member 60 (see Fig. 10) which may be a rod and which includes a forward end portion 61 adapted to slidably fit in the sleeve 38. The member 60 includes a collar 62 held in place as by a pin 63 which engages a relatively heavy spring 64. This spring 64 engages the partition 35 and normally urges the collar 62 and the rod 60 rearwardly to the position shown in Fig. 4. In this position the forward end portion 61 of the rod 60 has been moved rearwardly in the sleeve 36.

Near the front end the member 60 includes an outwardly projecting ear or crank 65 which fits in the slot 56 after the parts are assembled. When the rod 60 is turned the ear 65 engaging the lower wall of the slot 56 moves the arm 49 downwardly causing the ear 55 thereon to project beyond the slot 45 (see Fig. 9) and to perform a latch releasing operation as will be hereinafter described.

To assemble the bolt the arms 47 and 49 are preferably first secured in position and thereafter the rod 60 is moved to the position shown in Fig. 10 with the forward end of the spring 64 engaging the partition 35 and with the tongue 65 ready to slide down the inclined portion 57 of the slot 56. The rod 60 is then moved forward, compressing the spring 64, and as it does this the tongue 65 moves into the slot 56 and the forward end 61 of the rod enters the sleeve 38 previously described. When this is done the collar 62 on the rod 60 will have just passed beyond the partition 34 whereupon the rod 60 will be lowered so that it fits within the slots 36 and 37 with the spring 64 urging the collar 62 rearwardly and thereby urging the rod 60 rearwardly.

The collar 62 is so arranged that when it is urged rearwardly against the partition 34 the front end 61 of the rod 60 will be spaced slightly from the inner wall of the front 33 as shown in Fig. 6. The flat portion of the slot 56 is longer than the width of the tongue 65. This permits the tongue 65 to move forward slightly when the bolt 30 is held against advancing by the tongue 27 and the rod 60 is pushed causing the spring 64 to be compressed. The purpose of this action will be presently described.

The bolt is assembled by inserting the rod 60 through the slot 20 and then moving the rod and bolt rearwardly until the rod passes through the hole 24 and the inner ends of the rails 31 and 32 engage the end 23 of the support. In this position the notches 39 and 40 on the rails 31 and 32 of the bolt will fit beneath the wings 26 on the support and at the same time the front 33 of the bolt will be flush with the outer face of the selvage plate 19.

After the bolt is thus assembled the tongue 27 is pushed inwardly slightly so that it is in the position shown in Fig. 11 where it engages the front face of the partition 35 when the bolt is moved forwardly. Thus it will be seen that the parts merely have to be inserted in place and the tongue 27 bent slightly to provide a complete bolt assembly. The tongue 27 holds the parts assembled and also limits the forward movement of the bolt 30.

The bolt assembly, which is indicated generally at 70 and which is best shown in Fig. 4, further includes a tubular member 71 which is secured to the rod 60 as by a removable pin 72 to form an operating member. The forward end 73 of the tubular member 71 is spaced from the closure 23 of the support 16. A spring 74 has its forward end engaging the end 23 on the support 16 and its rear end engages the adjacent end 73 of the tube 71. This normally causes the tube 71 to be forced in a direction away from the end 23. The tube in turn pulls the rod 60 and the latter causes the bolt 30 to be normally urged inwardly along its support 16 to the position shown in Fig. 4.

The bolt assembly 70 further includes an inside handle supporting plate 75 which includes a base 76 and an end flange 77. The portion 77 has a hole 78 therein through which the tubular member 71 extends. The base 76 includes a threaded collar 79. The tubular member 71 has a sleeve 80 therein which is held in place by a pin 81. The sleeve 80 includes a crank arm 82 which is aligned with the collar 79. The arm 82 is adapted to be engaged and rocked by means to be later described.

In the illustrations each door is provided with a slot 83 (Figs. 12 and 13) in its front panel 84. Each slot 83 is of a size to receive the selvage plate 19 on the associated bolt assembly. On the inner face of each door panel 84 a pair of handle support plates 85 and 86 are held in place by spot welding as at 87. These plates 85 and 86 are spaced apart to provide a slot 88. The plates are notched at 89 to receive the bolt 30 and are cut away as at 90 to receive the flanges 18 on the base 17.

The plates 85 and 86 are provided with rails 91 and 92 respectively (see Fig. 13) which overhang the adjacent parts of the front door panel to form slots 93.

In assembly the support is moved rearwardly until the selvage plate 19 thereon engages the front face of the plates 85 and 86 with the selvage plate 19 fitting the slot 83. Suitable fastening means such as screws 94 are then inserted through the holes 22 in the selvage plate and pass into threaded holes in the plates 85 and 86. Thus the bolt support and bolt assembly are held against outer movement by the screws and against inner movement by engagement with the plates 85 and 86.

The bevelled converging flanges 18 of the support 16 are arranged beneath ears 95 on flanges 96 integral with plates 97 which are secured to the inner face of the inside panel 98 of the door as by welding at 99. The flanges 96 converge inwardly and the ears 95 incline downwardly and inwardly so that the flanges 18 on the bolt support are tightly wedged in place.

In moving the bolt assembly into place, the inner end of the tubular member 71 which is closed and rounded as at 100 passes through a circular hole 101 in the inner end panel 102 of the door so that it will engage the hinge pillar 103 as shown in Fig. 11 and Fig. 12. A pin 104 holds the plate 75 on the tube 71.

In operation, as the door is closed, the bolt 30 is advanced until the tongue 27 engages the partition 35. This engagement occurs before the bolt engages its strike. Thereafter, as the closing movement of the door is completed, the spring 64 is compressed, thus preventing sliding movement of the bolt transversely of the strike while the two are engaged. Thus undue wear is avoided. The spring 64 must be stronger than the spring 74 to effect this function.

The construction is such that as the door is opened the spring 74 pushes the tubular member 71 and the rod 70 towards the hinged side of the door thereby causing the collar 62 to retract the bolt so that the front face 33 of the bolt is flush with the outer face of the selvage plate 19 and with the outer face of the door. It takes this position when the door is partly opened so that the bolt is not in a position where it will be struck by a person entering the vehicle, and, further, there will be no greasy projecting member for the passenger to strike, thereby causing his clothing to be soiled.

In order to shift the arm 47 and cause the ear 52 thereon to project through the slot 44 and thus actuate a catch member, a handle assembly is provided. This assembly is indicated generally at 105 (see Figs. 11 and 13) and includes a body 106 shown as made from a single piece of material and including a grip portion 107.

The handle includes a bolt actuating member 119 having an end portion 120 with a reduced tip 121. A pivoted push member 125 is connected to the actuating member 119 by a pin 129.

When the door is closed the flat portion 53 on the catch release member 47 is engaged by the tip 121 on the actuating member 119 and is moved by the actuating member when the latter is operated by the push member 125. If the push member is pushed inward to catch release member releasing position prior to the closing of the door the tip 121 will run along the inclined portion 54 as the door is closed. This will cause the catch release member to be rocked to releasing position when the tip 121 reaches the end portion of the inclined portion 54. Thus inadvertent door closing with the push member pushed in will cause no breakage of parts.

The handle is fully described in the applicant's co-pending application Serial No. 533,958, filed May 3, 1944, now Patent No. 2,450,372, issued September 28, 1948, and a further description thereof in the present application is deemed unnecessary.

When the handle push button member 125 is depressed the tip 121 enters the slot 46 of the bolt and will engage the arm or catch release member 47 to actuate the latter to release a latch device which may be of the type which is fully described in applicant's co-pending application Serial No. 533,958, filed May 3, 1944, now Patent No. 2,450,372, issued September 28, 1948.

In order to turn the rod 60 and cause the ear 65 to move the arm or catch release member 49 so that the ear 55 projects through the slot 45 to thus actuate a latch releasing member, as described in applicant's Patent No. 2,450,372, issued September 28, 1948, an inside actuator or latch release member is provided and is indicated generally at 140 in Fig. 11. The inside latch releasing member 140 is fully described in the applicant's aforesaid patent. As shown, the device 140 includes a grip portion 141 (Fig. 12) and a portion 142 which has a slot 143 through which a finger tip actuated release member 144 protrudes. The member 144 is shown as mounted on a tubular member 145 which is internally threaded to receive a threaded sleeve 148.

The threaded sleeve 148 engages a U-shaped support 150. This support 150 carries a pin 151 which supports the finger tip actuated release member 144. The sleeve 148 engages the threads of the collar 79 so that when the handle is rotated the threads will cause the handle to approach the panel 98 of the door. An escutcheon plate 153 is arranged about the member 145. When the finger tip release member 144 is actuated it will rock the crank arm 82 to thus rotate the operating member 71 and thereby actuate the catch release member 49.

Having thus described my invention, I claim:

1. A latch assembly including a supporting base, a bolt member slidable on the base, the bolt member including a bolt head and a push member for the bolt head, the push member being mounted for rotation and including a portion remote from the bolt head which is adapted to engage and be pushed by a door frame to cause the bolt head to advance, resilient means normally urging the bolt head to retracted position, a catch release arm pivotally mounted on the bolt head, and means whereby rotation of the push member shifts the catch release arm.

2. In a latch assembly, a base plate including a body portion having vertical flanges thereon, the flanges converging towards one end of the base plate, the flanges decreasing in height towards the converging end, a pair of securing plates adapted to be mounted in opposed relation on a vehicle door, each securing plate having a flange, the flanges each having an ear, the last mentioned flanges converging inwardly and the ears converging downwardly, the body portion flanges being adapted to engage beneath the converging ears on the securing plates, and a bolt mounted on the base plate.

3. In a latch assembly, a base plate, a bolt member movable on the base plate, said bolt member including side members, a transverse member adjacent the rear end of the bolt member, a second transverse member spaced from the first transverse member, a push member for said bolt, said push member extending longitudinally of the bolt and intersecting said transverse members, spring means normally urging the push member rearwardly, a collar fixed on the push member and disposed between said transverse members, a second spring means, the second spring means being on the push member and having one end engaging the collar, the other end of the second spring means engaging the rear of the second transverse member, the second spring means urging the collar rearwardly towards the first transverse member, the second spring means being stronger than the first spring means.

4. In a bolt assembly, a casing adapted to be mounted on a vehicle door, a strike engaging bolt member movably mounted upon the casing for movement to and from strike engaged position, a catch release member associated with the bolt member, an elongaged operating member, a support plate adapted to be fixed upon a vehicle door at a location remote from said casing, said support plate including a bearing portion rotatably supporting the operating member, said operating member being adapted, when the operating member is rotated, to shift the catch release member to releasing position, an inside handle member including a portion engaging said support plate, and a finger tip operated push member carried by said handle member for rotating said operating member to shift the catch release member to releasing position.

5. In a bolt assembly, a casing adapted to be mounted on a vehicle door, a strike engaging bolt member movably mounted upon the casing for movement to and from strike engaged position, a catch release member associated with the bolt member, an elongated operating member, a support plate adapted to be fixed upon a vehicle door at a location remote from said casing, said support plate including a bearing portion rotatably supporting the operating member, said operating member being adapted, when the operating member is rotated, to shift the catch release member to releasing position, and an inside release device including an actuating member for rotating said operating member to shift the catch release member to releasing position.

6. In a bolt sub-assembly, a support plate adapted to be secured upon the interior of a vehicle door at a location remote from the free end of the door, an elongated bolt operating member, support means on the support plate for rotatably supporting one portion of the operating member for rotation about the longitudinal axis of the operating member, said operating member including a crank portion disposed adjacent to the support plate, a finger tip operated member engaging the crank portion and operable to rock the crank portion, the operating member at a location spaced axially along the operating member from the support plate having a portion thereon adapted to actuate a catch release member.

7. In a bolt sub-assembly, a support plate adapted to be secured upon the interior of a vehicle door at a location remote from the free end of the door, an elongated bolt operating member, support means on the support plate for rotatably supporting one portion of the operating member for rotation about the longitudinal axis of the operating member, an actuating member carried by the support plate and engaging the operating member to rock the latter, the operating member at a location spaced axially along the operating member from the support plate having a crank portion thereon, said crank portion being adapted to actuate a catch release member.

8. In a bolt sub-assembly, a support plate adapted to be secured upon the interior of a vehicle door at a location remote from the free end of the door, an elongated bolt operating member, support means on the support plate for rotatably supporting one portion of the operating member for rotation about the longitudinal axis of the operating member, a handle member mounted on the support plate, a finger tip operated push member mounted on the handle member, the operating member including a crank portion engaged by the push member so that movement of the push member rocks the operating member, the operating member, at a location spaced axially along the operating member from the support plate, having a portion thereon which is adapted to actuate a catch release member.

9. In a bolt sub-assembly, a support plate adapted to be secured upon the interior of a vehicle door at a location remote from the free end of the door, an elongated bolt operating member, support means on the support plate for rotatably supporting one portion of the operating member for rotation about the longitudinal axis of the operating member, a finger tip operated push member carried by the support plate, the operating member including a crank portion engaged by the push member so that movement of the push member rocks the operating member, the operating member, at a location spaced axially along the operating member from the support plate, having a portion thereon which is adapted to actuate a catch release member.

BURNIE J. CRAIG.

References Cited in the file of this patent

UNITED STATES PATENTS

| Number | Name | Date |
|---|---|---|
| 1,302,063 | Malone | Apr. 29, 1919 |
| 1,340,398 | O'Brien | May 18, 1920 |
| 1,758,263 | Merz | May 13, 1930 |
| 2,091,266 | Burnett | Aug. 31, 1937 |
| 2,261,674 | Davelaar | Nov. 4, 1941 |
| 2,298,598 | Sitter | Oct. 13, 1942 |
| 2,321,724 | Aldeen et al. | June 15, 1943 |